United States Patent [19]

Yanagisawa

[11] Patent Number: 5,357,500
[45] Date of Patent: Oct. 18, 1994

[54] MINIATURIZED DISC PLAYER

[75] Inventor: Tetsu Yanagisawa, Tokyo, Japan

[73] Assignee: Sony Corporation, Japan

[21] Appl. No.: 197,563

[22] Filed: Feb. 17, 1994

Related U.S. Application Data

[60] Continuation of Ser. No. 947,988, Sep. 21, 1992, abandoned, which is a continuation of Ser. No. 701,814, May 17, 1991, abandoned, which is a division of Ser. No. 629,623, Dec. 18, 1990, Pat. No. 5,119,362.

[30] Foreign Application Priority Data

Dec. 28, 1989 [JP] Japan ............ 1-152098[U]
Dec. 28, 1989 [JP] Japan ............ 1-152099[U]

[51] Int. Cl.$^5$ ............................................. G11B 21/02
[52] U.S. Cl. ........................... 369/215; 369/75.1; 369/229; 369/255; 369/269
[58] Field of Search ............... 369/215, 219, 258, 261, 369/263, 269, 75.1, 75.2, 77.1, 77.2, 255, 26; 360/78.12, 104, 105, 99.04, 98.07, 99.06, 99.08

[56] References Cited

U.S. PATENT DOCUMENTS

| | | | |
|---|---|---|---|
| 4,694,362 | 9/1987 | Oosaka et al. | 360/99.06 |
| 4,814,913 | 3/1989 | Mihara et al. | 360/78.12 |
| 4,815,055 | 3/1989 | Fago, Jr. | 369/36 |
| 4,819,100 | 4/1989 | Asano | 360/86 X |
| 4,831,615 | 5/1989 | Goto et al. | 369/223 |
| 4,870,703 | 9/1989 | Augeri et al. | 360/98.07 |
| 4,901,172 | 2/1990 | Nakazawa et al. | 369/37 X |
| 4,935,916 | 6/1990 | Suzuki et al. | 369/215 |
| 4,965,476 | 10/1990 | Lin | 360/98.07 |
| 5,028,829 | 7/1991 | Cap et al. | 360/90 |
| 5,038,240 | 8/1991 | Isomura | 360/99.08 |

FOREIGN PATENT DOCUMENTS

| | | |
|---|---|---|
| 59-116964 | 7/1984 | Japan . |
| 61-29464 | 2/1986 | Japan . |
| 63-317928 | 12/1988 | Japan . |
| 186376 | 3/1989 | Japan . |
| 1182975 | 7/1989 | Japan . |
| 273532 | 3/1990 | Japan . |

Primary Examiner—Eugene R. LaRoche
Assistant Examiner—Tan Nguyen
Attorney, Agent, or Firm—Ronald P. Kananen

[57] ABSTRACT

A pickup feeding apparatus is comprised of a first rack provided on a pickup supporting member supported so as to become movable along a guide shaft, a second rack provided slidably relative to the first rack, a drive force transmitting gear for transmitting a driving force of a driving source to the first and second racks, a spring member for spring-biasing one of the first and second racks to the other along the guide shaft of the first and second racks in such a direction that gear teeth of a gear of the drive force transmitting means which are meshed with the first and second racks are gripped. A disc player is also disclosed, in which a disc drive motor and a pickup feeding motor are provided on the same chassis and the disc drive motor is located on the chassis at the position above the pickup moving locus fed by the pickup feeding device.

5 Claims, 4 Drawing Sheets

MINIATURIZED DISC PLAYER

This application is a continuation of application Ser. No. 07/947,988 filed Sep. 21, 1992 now abandoned which is a continuation of Ser. No. 07/701,814 filed May 17, 1991, now abandoned which was a division of application Ser. No. 07/629,623 filed Dec. 18, 1990, now U.S. Pat. No. 5,119,362 issued Jun. 2, 1992.

BACKGROUND OF THE INVENTION

1. Field of the Invention

The present invention generally relates to a disc player and, more particularly, to a pickup feeding apparatus for feeding an optical pickup head.

2. Description of the Prior Art

Recently, a portable small disc player has been widely used as a disc player, particularly, a compact disc player. A pickup feeding mechanism portion of such conventional portable small disc player is arranged as shown in a plan view forming FIG. 1.

Referring to FIG. 1, a pickup head 41 is provided to read out a recorded signal from a disc (not shown), and this pickup head 41 is supported to a guide shaft 42 secured to a mechanical chassis (not shown) so as to move along the guide shaft 42 in the radius direction of the disc as shown by an arrow A in FIG. 1.

The pickup head 41 is provided with a rack 43 at its side opposite to the guide shaft 42. The rack 43 is meshed with an operation gear 44 that is rotated by a pickup moving motor (not shown). When the operation gear 44 is rotated by the motor, a rotational force of the operation gear 44 is transmitted to the rack 43 to thereby feed the pickup head 41.

In the thus arranged pickup feeding apparatus, if a backlash (play between teeth) lies between the rack 43 and the operation gear 44, a sufficient pickup servo characteristic cannot be obtained. Therefore, the rack 43 is constructed as a so-called double rack structure in order to prevent the vibration from being caused due to the backlash. This double rack structure will be explained below with reference to FIG. 2.

As shown in FIG. 2, the rack 43 is composed of a first rack 43a secured to the pickup head 41 and a second rack 43b slidable relative to the first rack 43a in the direction parallel to the pickup head moving direction. The second rack 43b is spring-biased in one direction by a spring member (compression coil spring) 45 so that teeth of the operation gear 44 are caught by the teeth of the two racks 43a and 43b, thereby removing the backlash.

As described above, in the pickup feeding apparatus of the standard disc player, the rack must be constructed as the double rack structure in order to remove backlash occurring between the rack and the operation gear, and the spring member must be provided in order to spring-bias one rack, which requires a spacing of this spring member. This hinders the pickup feeding apparatus from being miniaturized.

Incidentally, a drive mechanism of a disc player is generally comprised of a disc drive mechanism for rotating a disc and a pickup feeding mechanism for feeding a pickup device which reads out a signal from the disc.

The disc drive mechanism and pickup feeding mechanism include motors and drive circuits for controlling these motors, respectively.

Considering the arrangement in which the motors and the drive circuits are provided in the disc player, the motors and the drive circuits are independently mounted on the disc player. To be more concrete, the motor finished as one motor unit is attached to the mechanical chassis and the driving circuit for this motor is mounted on a circuit board which is attached to the mechanical chassis at its portion different from that of the motor.

As earlier stated, the portable thin-type disc player has become very popular recently and it is requested that the disc player be made compact in size and be greatly reduced in thickness. However, since the motor and the circuit board are independently provided in the conventional disc player as described above, unavoidably the disc player cannot be miniaturized in size and reduced in thickness as is expected.

OBJECTS AND SUMMARY OF THE INVENTION

Accordingly, it is an object of the present invention to provide an improved pickup feeding apparatus in which the aforenoted shortcomings and disadvantages encountered with the prior art can be eliminated.

More specifically, it is an object of the present invention to provide a pickup feeding apparatus in which space can be saved.

It is another object of the present invention to provide a pickup feeding apparatus in which mechanisms can be more miniaturized.

It is still another object of the present invention to provide a pickup feeding apparatus in which freedom can be increased from a design standpoint.

It is a further object of the present invention to provide an improved disc player which can remove the above-mentioned shortcomings and disadvantages of the prior art.

It is yet a further object of the present invention to provide a disc player in which spaces for locating motors and circuit boards can be saved considerably.

It is still a further object of the present invention to provide a disc player which can be more miniaturized and which can be greatly reduced in thickness.

According to a first aspect of the present invention, a pickup feeding apparatus is comprised of a first rack provided in a pickup supporting member supported so as to become movable along a guide shaft, a second rack provided slidably relative to the first rack, a drive force transmitting gear for transmitting a driving force of a driving source to the first and second racks, a spring member for spring-biasing one of the first and second racks to the other along the guide shaft of the first and second racks so that gear teeth of the drive force transmitting means are caught by teeth of the first and second racks.

In accordance with a second aspect of the present invention, a disc player is also disclosed, in which a disc drive motor and a pickup feeding motor are provided on circuit boards secured to a chassis and one of a coil and a magnet of each of the motors is mounted on the circuit boards.

The above, and other objects, features and advantages of the present invention will become apparent from the following detailed description of illustrative embodiments to be taken in conjunction with the accompanying drawings, in which like reference numerals are used to identify the same or similar parts in the several views.

DETAILED DESCRIPTION OF THE PREFERRED EMBODIMENTS

The present invention will now be described in detail with reference to FIGS. 3 to 6.

Figure 5:
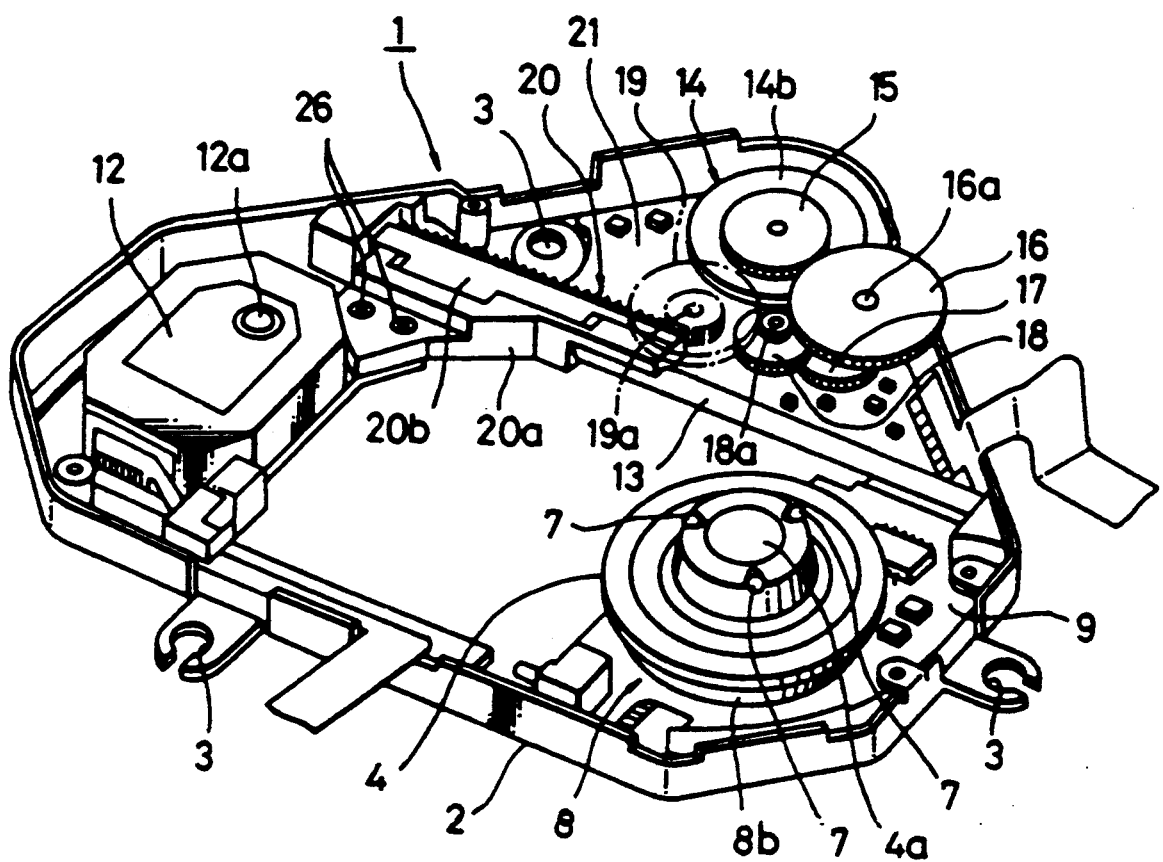
FIG. 5 is a perspective view of a disc drive mechanism of a disc player to which the present invention is applied.
Figure 6:
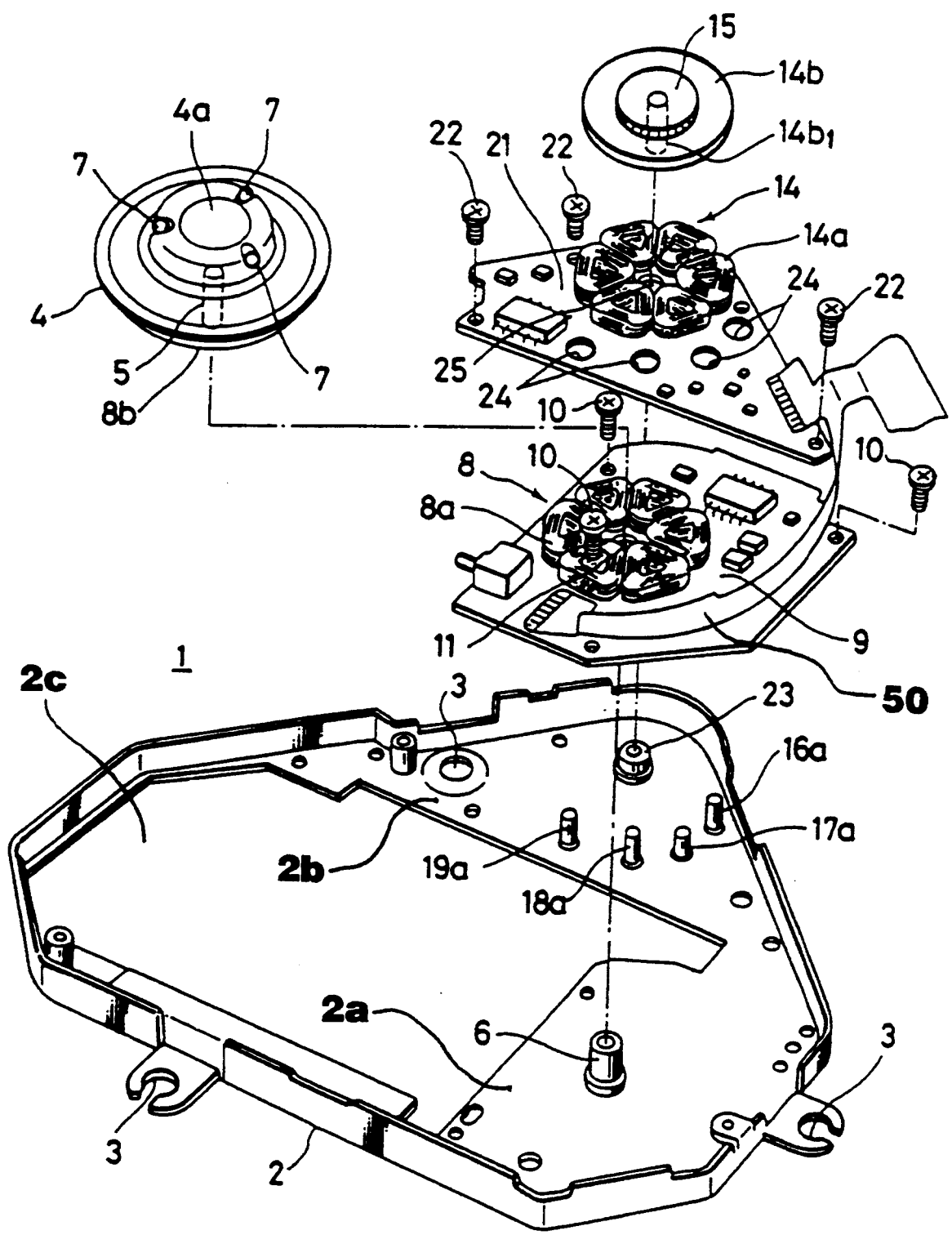
FIG. 6 is an exploded perspective view of FIG. 5.

As shown in FIGS. 5 and 6, there is provided a disc drive mechanism 1 of a portable disc player and of which mechanism parts are mounted on a mechanical chassis 2. A plurality of supporting apertures 3 are bored through the mechanical chassis 2, and the mechanical chassis 2 is supported at its supporting apertures 3 to an outer casing of the disc player by means of a spring member (not shown) in a floating condition.

A disc drive mechanism and a pickup feeding mechanism are arranged on the mechanical chassis 2, and the disc drive mechanism and the pickup feeding mechanism will be described more fully below. As shown in FIG. 6, the mechanical chassis is formed with first and second plate portions 2a, 2b and an opening 2c. The disc drive mechanism is constructed as follows.

Referring to FIGS. 5 and 6, a turntable 4 is provided to hold thereon a disc (not shown), and this turntable 4 is rotatably supported to a bearing portion 6 implanted on the first plate portion 2a the mechanical chassis 2 by means of a shaft 5 protruded from the central portion of the turntable 4. In the turntable 4, a plurality of supporting ball members 7 are resiliently protruding from the circumferential surface area of a central convex portion 4a of the turntable 4, which is engaged with the central aperture of the disc so that, when the central aperture of the disc is engaged into the central convex portion 4a of the turntable 4 against the resilient force of the supporting ball members 7, the disc can be simply and reliably supported on the turntable 4.

As shown in FIGS. 5 and 6, a motor 8 is provided to rotate the turntable 4 and this motor 8 is directly constructed on a circuit board 9 on which a motor driving circuit for the motor 8 is formed. More specifically, the circuit board 9 on which motor driving circuit assembly parts are mounted is secured to the mechanical chassis 2 by a screw 10, and a stator coil 8a of the motor 8 is secured to the circuit board 9, while a rotor magnet 8b is secured to the lower surface of the turntable 4 in an opposing relation to the stator coil 8a.

As shown in FIG. 6, the circuit board 9 has formed therethrough an escape aperture 11 into which the bearing portion 6 is inserted, whereby the circuit board 9 can be located under the turntable 4 without disturbing the bearing portion 6, thus the space being saved.

On the other hand, the pickup feeding mechanism is arranged as follows.

Figure 1:
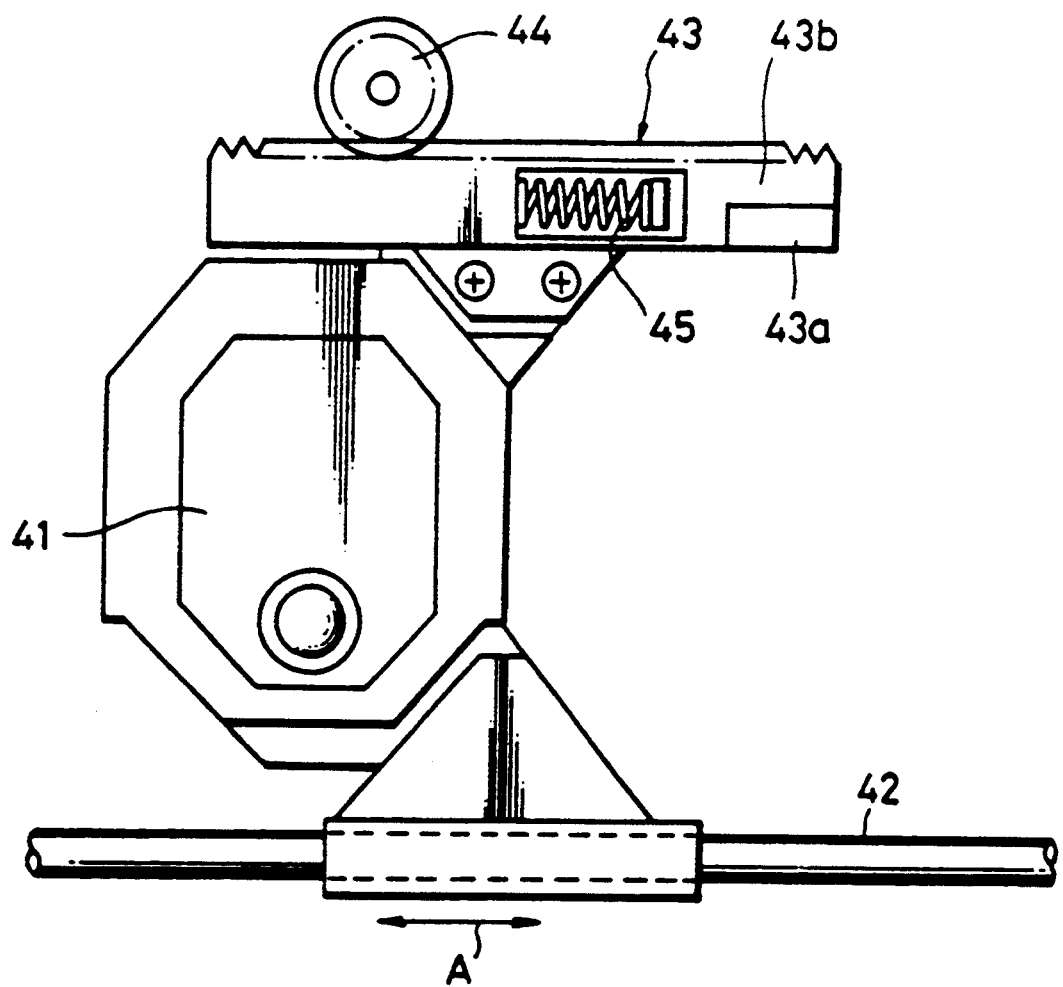
FIG. 1 is a plan view illustrating an example of a conventional pickup feeding device.
Figure 2:
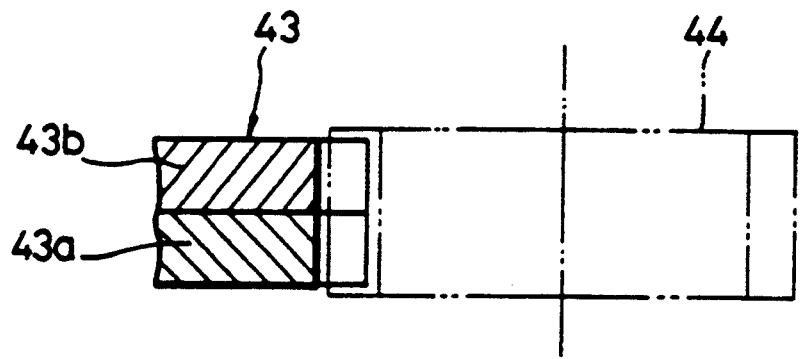
FIG. 2 is a schematic diagram showing a double rack structure of the conventional pickup feeding device.
Figure 3:
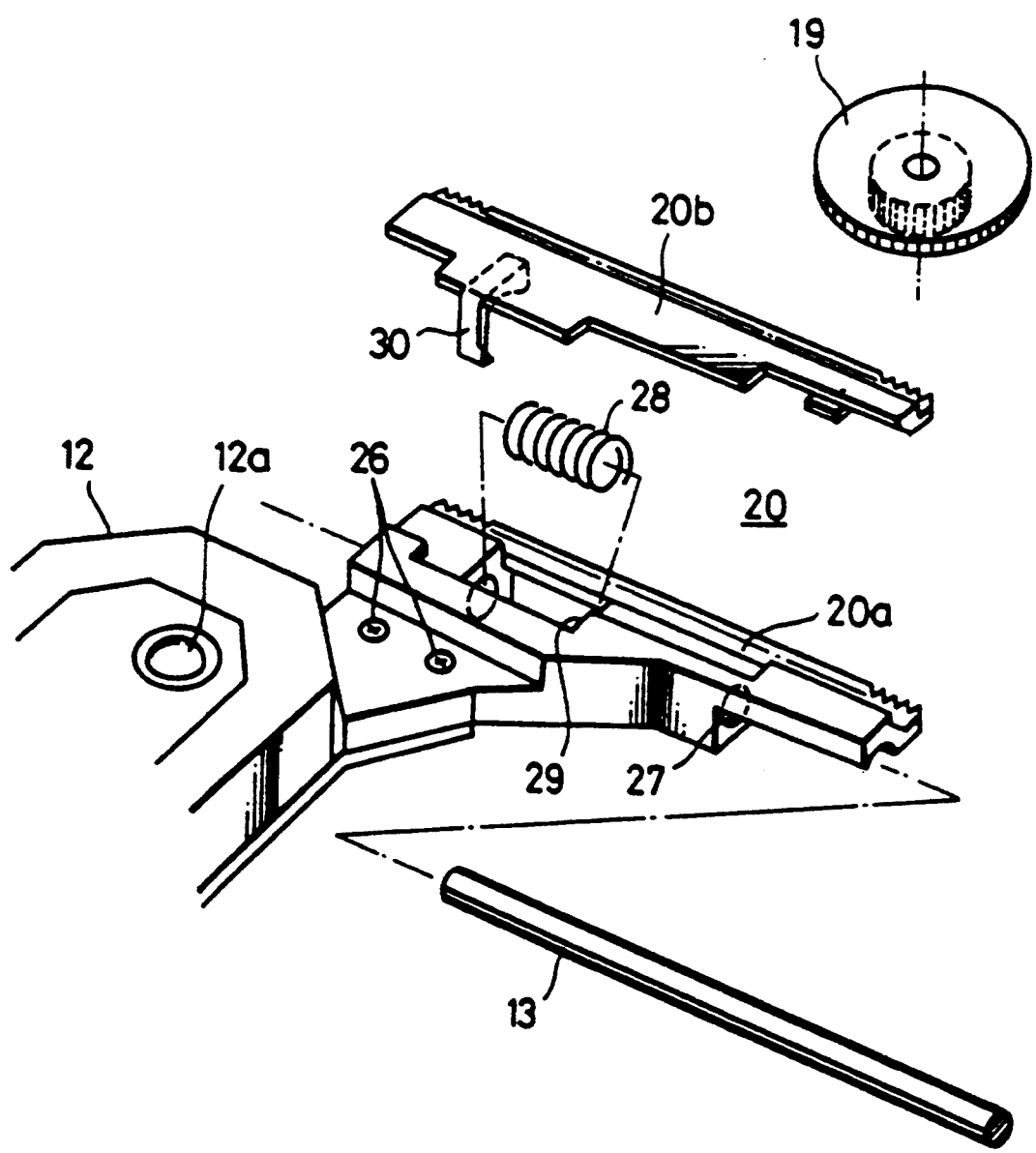
FIG. 3 is a fragmentary perspective view illustrating a main portion of an embodiment of a pickup feeding device according to the present invention in an exploded fashion.
Figure 4:
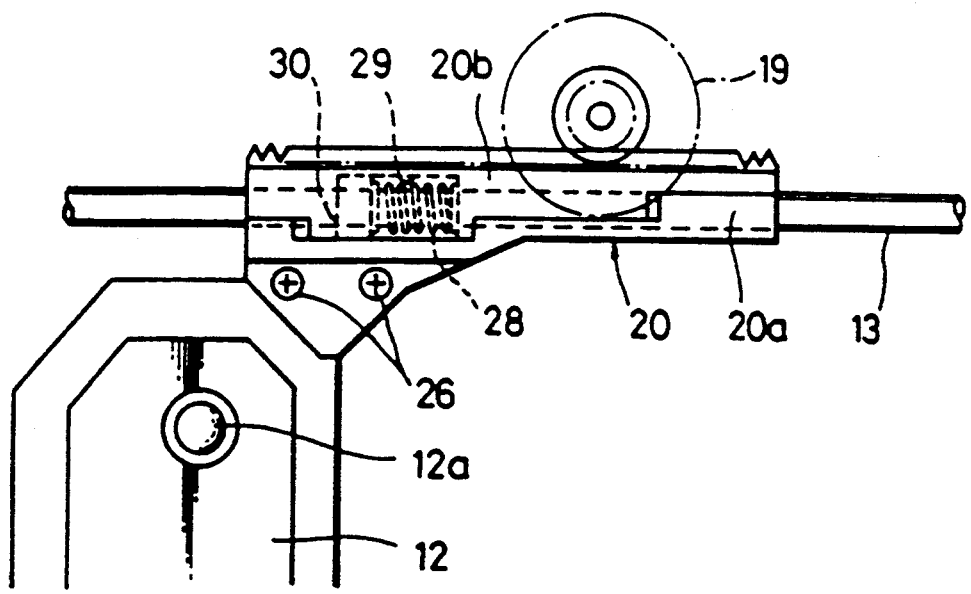
FIG. 4 is a plan view of FIG. 3.

As shown in FIGS. 3 to 5, a pickup device 12 has an objective lens 12a provided on an upper surface thereof, and a signal recorded on the disc is read out by laser beams emitted through the objective lens 12a.

The pickup device 12 is supported by a guide shaft 13 secured to the mechanical chassis 2 so that the pickup device 12 can be moved along the guide shaft 13 and through the opening 2c in the radial direction of the disc.

The pickup device 12 is moved by a motor 14. As shown in FIGS. 5 and 6, a gear 15 is attached to the motor 14 and this gear 15 is meshed with an operation gear 19 through a plurality of reduction gears 16, 17 and 18. These reduction gears 16, 17 and 18 and the operation gear 19 are pivotally supported by shafts 16a, 17a, 18a and 19a implanted on the second plate portion 2b of the mechanical chassis 2, respectively, as shown in FIG. 6.

As shown in FIGS. 3 to 5, a rack 20 is provided on the pickup device 12 side, and this rack 20 is meshed with the operation gear 19, whereby the rotational force of the motor 14 is transmitted to the rack 20 through the reduction gears 16, 17, 18 and the operation gear 19, thus the pickup device 12 being moved.

Similarly to the above-mentioned disc drive motor 8, the motor 14, as the driving source of the pickup device 12, is directly constructed on a circuit board 21 on which its drive circuit is formed. More specifically, as shown in FIG. 6, the circuit board 21 on which pickup feeding circuit assembly parts are mounted is secured to the mechanical chassis 2 by means of screws 22, and a stator coil 14a of the motor 14 is secured on this circuit board 21, while a rotor magnet 14b is rotatably supported to a bearing portion 23 implanted on the second plate portion of the mechanical chassis 2 by a shaft 14b1 protruded from the central portion of the rotor magnet 14b in an opposing relation to the stator coil 14a. The gear 15 which is meshed with the reduction gear 16 is integrally secured to the central portion of the upper surface of the rotor magnet 14b.

The circuit board 21 has formed therethrough escape apertures 24 and 25 into which the shafts 16a to 19a and the bearing portion 23 are inserted, respectively, whereby the circuit board 21 can be located on the second plate portion of the mechanical chassis 2 without disturbing the shafts 16a to 19a and the bearing portion 23. Thus space is saved and the player is miniaturized.

While in this embodiment coils of the motors are secured to the circuit boards, reverse arrangements are also possible. That is, the magnets may be secured to the circuit boards. As shown in FIG. 6, a flexible cable 50 establishes an operative electrical connection between circuit board 9 and circuit board 21.

As described above, according to the disc player of this embodiment, since the disc drive motor 8 and the pickup feed motor 14 are directly arranged on the circuit boards 9 and 21 which are secured to the mechanical chassis 2, the spacing in which the motors 8 and 14 and so on are located can be considerably saved and the disc player can be made remarkably smaller in size and reduced in thickness.

The construction of the rack 20 in the pickup feeding mechanism portion will be explained.

As shown in FIG. 3, the rack 20 is composed of a first rack 20a secured to the pickup device 12 by means of screws 26 and a second rack 20b slidable relative to the first rack 20a in the direction parallel to the pickup feeding direction. That is, the rack 20 is constructed as a so-called double rack.

The first rack 20a has formed therethrough an insertion through-hole 27 into which the guide shaft 13 is inserted. In other words, according to the arrangement of this embodiment, the pickup device 12 is supported to the guide shaft 13 by means of the first rack 20a.

The second rack 20b is spring-biased to the first rack 20a by a compression coil spring 28 in one direction parallel to the pickup feeding direction, thereby preventing the rack 20 and the operation gear 19 from being vibrated due to backlash therebetween.

The compression coil spring 28 for removing the backlash is provided on the first rack 20a at its position through which the guide shaft 13 is inserted. More precisely, according to this embodiment, an accommodating concave portion 29 is formed on the first rack 20a by cutting away the intermediate portion of the insertion aperture 27. The compression coil spring 28 is inserted into this accommodating concave portion 29 and the guide shaft 13 is inserted into the compression coil spring 28 as shown in FIG. 4.

As shown in FIG. 4, the compression coil spring 28 acts in the expanding direction between an engaging member 30 protruded on the second rack 20b and one end face of the accommodating concave portion 29 to thereby spring-bias the second rack 20b in one direction (in the left of FIG. 4) parallel to the guide shaft 13. Consequently, the teeth of the operation gear 19 are caught by the teeth of the two racks 20a and 20b, thereby removing the backlash.

As described above, according to this embodiment, since the pickup device 12 is supported by the guide shaft 13 by means of the rack 20 and the compression coil spring 28 for removing backlash is provided within the rack 20 at its position in which the guide shaft 13 is inserted into the compression coil spring 28, the space can be utilized effectively and as a result, the pickup feeding device can be miniaturized more.

As set out above, according to the pickup feeding device of the present invention, since the spring member for removing the backlash is provided within the rack at its position in which the guide shaft is inserted into the spring member, the space occupied by the spring member can be substantially removed and the space can be saved as compared with the prior art accordingly. There is then the advantage that the pickup feeding device can be miniaturized more.

Further, in the pickup feeding apparatus of this embodiment, since the spring member is inserted by the guide shaft, the spring member can be prevented from being disengaged from the rack without a complicated spring supporting mechanism. In actual practice, there can be achieved various effects, such as the miniaturized mechanism, increased freedom in designing and so on.

Furthermore, according to the disc player of the present invention, since the disc drive motor and the pickup feed motor are respectively provided on the circuit boards secured to the chassis, the space within the disc player can be saved considerably so that the entirety of the disc player can be miniaturized as compared with the conventional disc player.

Furthermore, since each of the motors is arranged such that either of the coil and magnet is secured to the circuit board, the disc player of the present invention can be reduced in thickness as compared with the conventional disc player in which the motor finished as the motor unit is secured to the mechanical chassis.

In addition, since the motors and the circuit boards are integrally formed, the assembly process can be reduced and hence the disc player of the present invention can be manufactured at low cost. Also, a freedom in designing can be increased.

Having described preferred embodiments of the present invention with reference to the accompanying drawings, it is to be understood that the invention is not limited to those precise embodiments of the invention and that various changes and modifications thereof could be effected by one skilled in the art without departing from the spirit or scope of the novel concepts of the invention as defined in the appended claims.

I claim as my invention:

1. A disc drive mechanism mounted on a mechanical chassis comprising:
    a mechanical chassis formed with an opening and first and second plate portions;
    a turntable for supporting a disc, said turntable being rotatably mounted to said first plate portion of said chassis;
    a turntable motor for rotating said turntable including a first rotor magnet and a first stator coil;
    a first circuit board which is discrete from said chassis and located beneath said turntable, said first circuit board being deteachably mounted to said first plate portion of said chassis;
    a pickup device capable of moving in said opening and translationally with respect to said turntable;
    a pickup device motor for moving said pickup device translationally, said pickup device motor including a second rotor magnet and a second stator coil which are mounted on said second plate portion of said chassis;
    a second circuit board which is discrete from said first circuit board, said second circuit board being detachably mounted to said second plate portion of said chassis and connected to said first circuit board by a cable; and
    a plurality of gears rotatably mounted on said second plate portion via said second circuit board and connected between said pickup device motor and said pickup device;
    wherein either of said first rotor magnet and said first stator coil are mounted to said first circuit board and either of said second rotor magnet and said second stator coil are mounted to said second circuit board.

2. The disc drive mechanism of claim 1, wherein said turntable is mounted to said chassis by a bearing means and said first circuit board includes a hole for receiving said bearing means wherein said first circuit board is located below said turntable.

3. The disc drive mechanism of claim 1, wherein said pickup device includes a rack means formed along one side thereof and gears are provided to transmit force from said pickup device motor to said rack means to move said pickup device translationally.

4. The disc drive mechanism of claim 3, wherein said gears are mounted on shafts and said second circuit board includes holes for receiving said shafts.

5. The disc drive mechanism of claim 4, wherein said rack means includes a first and second rack connected by a spring means to ensure engagement with said gears.

* * * * *